United States Patent [19]

Nusbaum

[11] Patent Number: 4,625,480
[45] Date of Patent: Dec. 2, 1986

[54] UNDERFLOOR ASSEMBLY AND CABLE DISTRIBUTION SYSTEM AND CABLE TRENCH THEREFOR

[75] Inventor: Arthur Nusbaum, Tenafly, N.J.

[73] Assignees: Robert Nusbaum; Howard Nusbaum, both of New York, N.Y.; Barbara Selick, Teaneck, N.J.

[21] Appl. No.: 766,593

[22] Filed: Aug. 19, 1985

Related U.S. Application Data

[62] Division of Ser. No. 459,599, Jan. 20, 1983, Pat. No. 4,558,546.

[51] Int. Cl.$^4$ .................... E04F 17/08; H02G 3/18
[52] U.S. Cl. .................................. 52/221; 52/220; 174/49
[58] Field of Search .................. 52/220, 221; 174/49

[56] References Cited

U.S. PATENT DOCUMENTS

| | | | |
|---|---|---|---|
| 2,910,152 | 10/1959 | Edgar | 52/220 |
| 3,289,368 | 12/1966 | Mark | 52/220 |
| 3,426,492 | 2/1969 | Fork | 52/221 |
| 3,426,802 | 2/1969 | Fork | 52/221 |
| 3,453,791 | 7/1969 | Fork | 52/221 |
| 3,459,875 | 8/1969 | Fork | 52/221 |
| 3,721,051 | 3/1973 | Fork | 52/221 |
| 3,903,666 | 9/1975 | Fork | 52/221 |
| 4,040,755 | 8/1977 | Jorgensen et al. | 52/221 |
| 4,125,977 | 11/1978 | Michlovic | 52/220 |
| 4,338,484 | 7/1982 | Littrell | 52/221 |

FOREIGN PATENT DOCUMENTS

| | | | |
|---|---|---|---|
| 401591 | 2/1967 | Australia | 174/49 |
| 887784 | 1/1962 | United Kingdom | 52/221 |

Primary Examiner—Carl D. Friedman
Assistant Examiner—Michael Safavi
Attorney, Agent, or Firm—Jacobs & Jacobs

[57] ABSTRACT

The underfloor assembly for a building comprises corrugated metal flooring units preferably side-by-side with cable distribution ducts, over which is mounted cable trenches. Each distribution duct has a bottom plate and a preferably inverted U-shaped top, the tops extending between adjacent intersections of the trench with the ducts to thus leave the duct open under the trenches. The bottoms of the trenches are open where they intersect the ducts, and the trenches are formed by field assembly of trench subunits that have a U-shaped bottom pan with cut-outs on either side of a preferably centrally located bottom portion, as well as a cover removably closing the pan.

2 Claims, 8 Drawing Figures

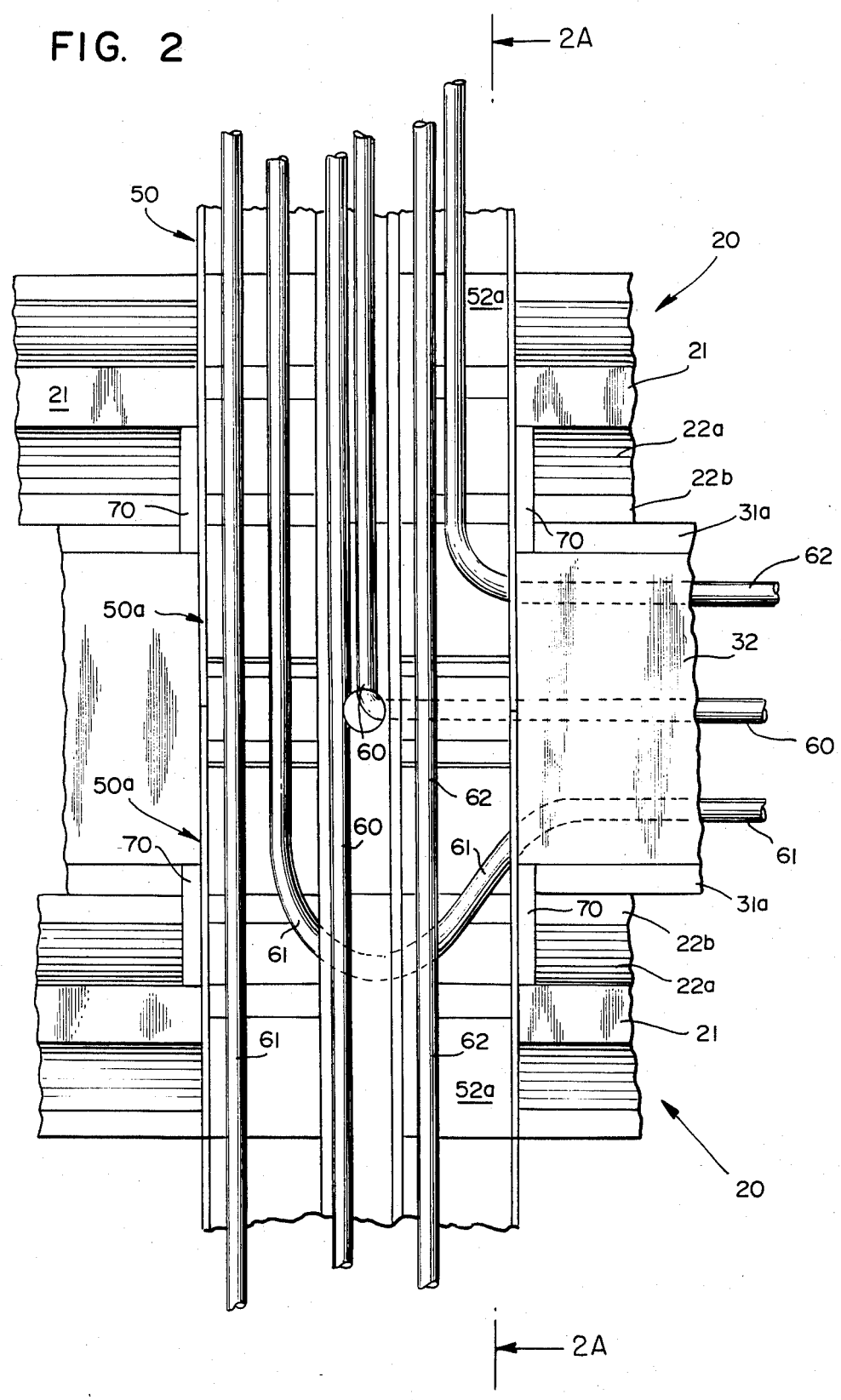

UNDERFLOOR ASSEMBLY AND CABLE DISTRIBUTION SYSTEM AND CABLE TRENCH THEREFOR

CROSS-REFERENCE

This is a divisional of Ser. No. 459,599, filed Jan. 20, 1983, now U.S. Pat. No. 4,558,546.

The present invention relates to an underfloor assembly for a metal deck and concrete floor. In particular, the present invention comprises a corrugated metal flooring and a cable distribution system, which are then covered with an overlying layer of concrete to provide the floor of a building.

A variety of underfloor cable distribution systems has been proposed in the art. For example, see Fork, U.S. Pat. No. 3,721,051 and the prior art referrred to and cited therein. Other Fork patents describing underfloor raceways are U.S. Pat. Nos. 3,426,802 and 3,453, 791.

The Fork patents describe a variety of electrified deck systems comprising cellular metal flooring and a series of spaced-apart, electrical cable trenches overlying the cellular flooring. Access between the trenches and the cellular flooring is provided by using electrical trenches that have factory-punched openings in the top and bottom of the trench, thereby exposing the cellular flooring underneath the trenches. Fork U.S. Pat. No. 3,721,051 states that there are disadvantages to the use of factory-punched openings and provides instead a so-called "bottomless" trench, wherein the trench has top and side walls, but no bottom. While this may provide advantages over the use of cable trenches having factory-punched openings, nevertheless the bottomless trench does raise problems relating to economies of manufacture, field installation and use by the tenant of the electrical system thus created.

The present invention does not use the bottomless trench concept of Fork, but rather the present invention provides an underfloor assembly comprising, in combination, a cable trench having factory-provided openings therein overlying corrugated metal flooring units and cable distribution ducts arranged side-by-side.

In particular, the present invention provides an underfloor assembly for a building, comprising a plurality of elongated, corrugated, metal flooring units and a plurality of elongated, metal cable distribution ducts preferably arranged side-by-side with said flooring units, said flooring units and said cable distribution ducts being adapted to be supported by the structural beams of the building; and a plurality of spaced-apart elongated cable trenches adapted to carry cables of different types therein and extending over and transversely across said flooring units and said cable distribution ducts; said cable distribution ducts comprising longitudinally extending wall means having top, bottom and opposed side portions together defining a housing, and divider means within said housing for providing longitudinally extending cells within said housing adapted to contain and separate cables of different types, said housing having substantially only said bottom portion of said wall means at the intersections of said trenches and said cable distribution ducts; said trenches comprising a longitudinally extending U-shaped base pan means having a bottom portion and opposed side portions, and cover means for closing said U-shaped base pan means, said bottom portion of said base pan means having apertures therein at said intersections of said trenches and said distribution ducts for permitting direct access from said trench to the distribution duct below.

The present invention is illustrated in terms of a preferred embodiment in the accompanying drawings, in which:

FIG. 2 is an enlarged top plan view of the intersection of a cable trench and a cable distribution duct according to the invention, with the trench covers removed;

Figure 1:
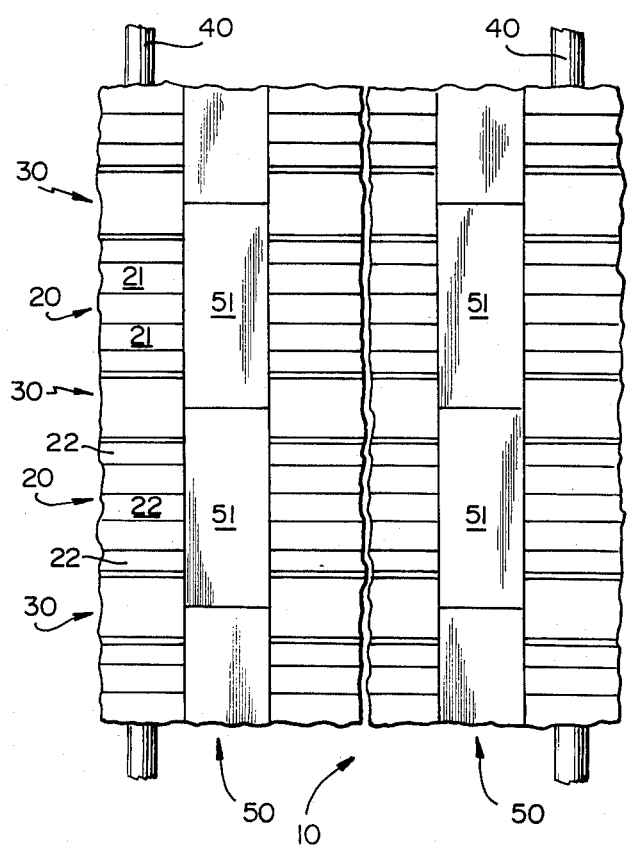
FIG. 1 is a diagrammatic top plan view of an underfloor assembly according to the invention.

Referring to the drawings, FIG. 1 shows an underfloor assembly 10 comprising conventional corrugated metal flooring units 20 having alternating crests 21 and troughs 22, joined edge-to-edge in a conventional manner to distribution ducts 30 which are also made of metal. The metal flooring 20 and the cable distribution ducts 30 are supported by structural beams 40, in a conventional manner.

A plurality of cable trenches 50 made of metal rest on the metal flooring 20 and the distribution ducts 30. Trenches 50 are tack-welded or bolted to the metal flooring 20 and ducts 30 as is conventional. Trenches 50 have removable covers 51 to permit access to the distribution ducts 30 as will be described in detail hereinafter. After the assembly 10 has been completed, concrete is poured over the metal flooring 20 and cable distribution ducts 30 so as to be level with the top of the trenches 50, as is conventional. Covers 51 are kept on the trenches 50 during the pouring of the concrete so as to keep concrete from entering the trenches 50.

Referring to FIG. 2, it can be seen that the metal flooring 20 and the distribution ducts 30 are in side-by-side relationship. Conveniently, ducts 30 are 18 inches wide and are spaced apart four feet center-to-center. Any conventional corrugated metal flooring may be used as the metal flooring 20. FIG. 2 shows trench 50 with the removable covers 51 removed for clarity in revealing the intersection of trench 50 and distribution duct 30.

Figure 3:
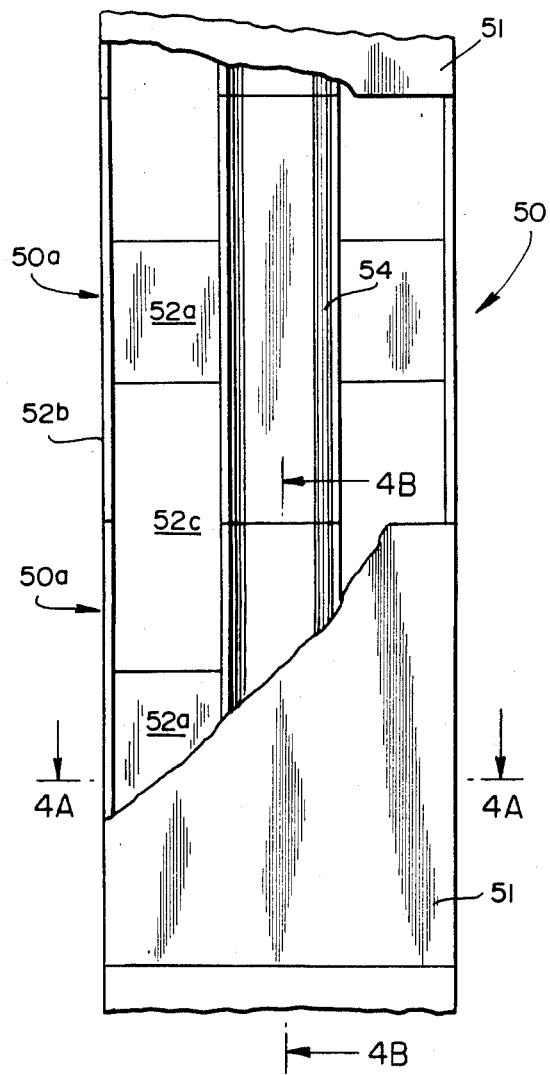
FIG. 3 is a top plan view of the cable trench according to the present invention.
Figure 4A:
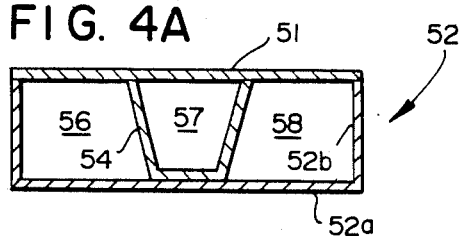
FIG. 4A is an elevational view, in section, taken along lines 4A—4A in FIG. 3.
Figure 4B:
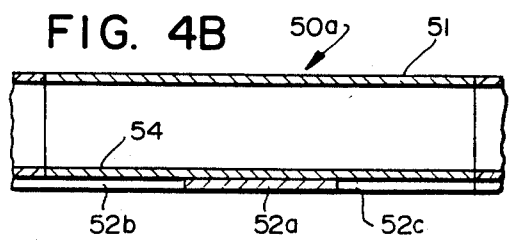
FIG. 4B is an elevational view, in section, taken along lines 4B—4B in FIG. 3.

As is most clearly seen in FIGS. 3, 4A and 4B, cable trench 50 is formed of a U-shaped base pan 52 having a horizontal bottom 52a and upright vertical sides 52b. Most desirably, the vertical sides 52b are integral with the bottom 52a of the base pan 52. Covers 51 are removably secured to the top of trench 50 by suitable fastening means (not shown), such as bolts, that are used in cable trenches.

Figure 2A:
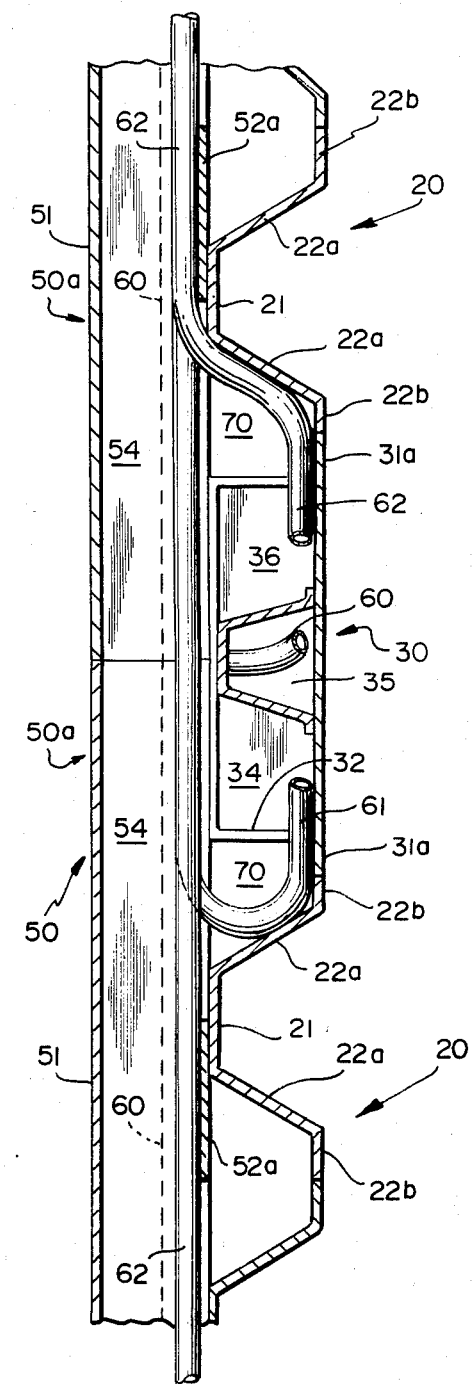
FIG. 2A is an elevational view, in section, taken along lines 2A—2A in FIG. 2.

While the vertical walls 52b of base pan 52 are continuous along the extent of trench 50, the bottom 52a of the base pan 52 has several access windows or apertures 52c (FIG. 3) so that when cover 51 is removed, access to the distribution duct 30 (FIG. 2) is permitted through the aperture 52c. Aperture 52c extends longitudinally along trench 50 for a sufficient distance such that the edges of the base pan bottom 52a will lie approximately at the mid-point of a crest 21 of the metal cellular flooring 20 (FIG. 2A). In this way, there is some tolerance in the placement of trench 50 over the metal flooring units 20. Using the spacing and width of ducts 30 set forth above, trenches 50 may be 18 inches wide and apertures 52a may be 30 inches long.

Preferably centrally located within trench 50 is a U-shaped trough 54 which is welded or otherwise secured to the base pan bottom 52a. Trough 54 will usually carry electrical power cables 60 (FIG. 2), but in a given system, any of the cells 56, 57, 58 (FIG. 4A) may be the power cable cell.

As is seen most clearly in FIGS. 3, 4A and 4B, trench 50 is composed of sub-units 50a, which comprise a pair of opposed side walls 52b, a centrally located base pan bottom 52a, and a section of trough 54 coextensive with side walls 52b. Components 52a, 52b and 54 may be separately formed and then attached together or they may be all integrally formed, as by roll forming. Sub-units 50a are preferably shipped with covers 51 attached and they are field assembled to form trench 50 by bolting adjacent ends of sub-units 50a together. In this way, each sub-unit 50a has sufficient structural integrity for transport and field assembly.

Each sub-unit 50a has half of an aperture 52c at each end, the full extent of each aperture 52c being formed when adjacent sub-units 50a are connected.

Beneath trench 50 (FIG. 2) lies the cable distribution duct 30 which comprises an elongated continuous bottom plate 31 to which is welded an inverted U-shaped top member 32. Within duct 30 is a longitudinally extending, inverted U-shaped member 33, which is shown as being secured to base 31 by any suitable means, such as welding. However, as in the case of trench 50, duct 30 may be roll-formed as an integral unit.

Figure 5:
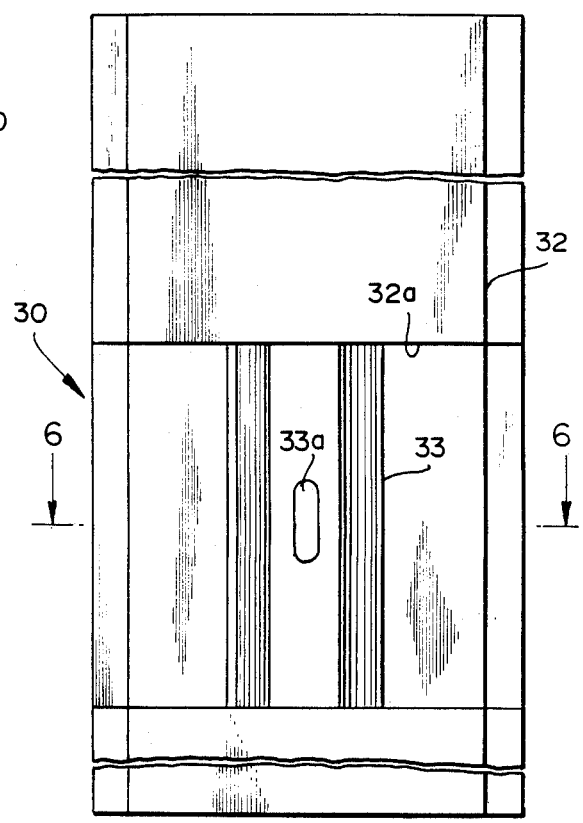
FIG. 5 is a view similar to FIG. 3 showing the cable distribution duct according to the present invention.
Figure 6:
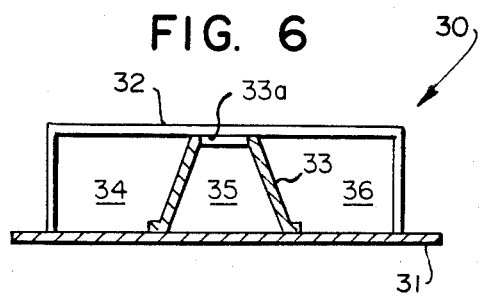
FIG. 6 is an elevational view, in section, taken along lines 6—6 in FIG. 5.

At suitable intervals along the length of duct 30, a portion of the top 32 (FIG. 5) is omitted to provide apertures 32a between adjacent portions of the top 32. Apertures 32a provide access to cells 34, 35 and 36 (FIGS. 2A and 6) at the areas of intersection between trench 50 and cable distribution duct 30. Member 33 may be provided as shown with a pre-formed access port 33a to allow electrical cable 60 (FIG. 2) lying in member 54 of trench 50 to pass from the trench 50 through port 33a and thence into cell 35. Alternatively, port 33a may be field drilled. Again, any of the cells 34, 35 and 36 may be the power cable cell.

FIGS. 2 and 2A illustrate how the cables 60, 61 and 62 enter the distribution duct 30. Thus, the large aperture 32a in duct 30 permits free and easy access of cables 61 and 62 into cells 34 and 36, respectively. It is preferred that the cells 34 and 36 are larger in cross-section than cell 35. The larger cells 34 and 36 may be used for telephone, computer cables and other special services, which as is well known, are larger and far more numerous than the electrical power cables 60.

While the cross-section of cell 35 remains the same along duct 30, cells 34 and 36 have greatly enlarged cross-sectional areas where ducts 30 intersect trenches 50. Thus, cells 34 and 36 have a much larger width under the trench 50 than inside duct 30 because cover 32 is omitted from duct 30 at the intersections of ducts 30 with trenches 50. As seen most clearly in FIG. 2A, cells 34 and 36 each extend from the inclined side of member 33 to the opposed inclined wall 22a of the adjacent flooring unit 20.

Given the dimensions above, it is presently preferred that bottom plate 31 is 18 inches wide, that top 32 is 15 inches wide, and that member 33, which is centrally located on plate 31 have a base that is 3 inches wide. Flooring units 20 are commercially manufactured with crests 21 and 12 inch centers, a toe 22b of 1.5 inches and a distance of (measured horizontally of 3 inches from the trailing edge of toe 22b to the leading edge of crest 21. This will provide a width of 9 inches at the bottom of each of cells 34 and 36 and 12 inches at the top, disregarding the small amount gained from the inclined wall of member 33. This will easily accommodate large bends in cables 61 and 62, and splices therein, such that the bends and splices will be below (FIG. 2A) the trench 50, thereby enabling the full space inside trench 50 to be used for carrying cables, rather than having to dedicate some of this space for the inevitable bends and splices.

Completing the underfloor assembly 10 are plugs 70 (FIG. 2A), which are installed as by welding before the concrete is poured so as to prevent concrete from otherwise entering the open apertures 32a and 52a during the cement pour.

The underfloor assembly 10 according to the invention is assembled as follows. First the metal flooring 20 and the distribution ducts 30 are secured in place and joined together on beams 40 (FIG. 1) and then the trench sub-units 50a, with covers 51 attached, are set down, connected together and secured to ducts 30 and to the crests 21 of the metal flooring 20. After the concrete is poured and set, covers 51 are removed and cables 60, 61 and 62 are then fed through the trenches 50 and the ducts 30. Interconnections between the cables in trenches 50 and ducts 30 are easily made at the desired point of interconnection, because the full extent of the cells 34, 35 and 36 is readily accessed. Bulky splices in the cables 61 and 62 in the trenches 50 and the ducts 30 are accommodated below trench 50 in the large cells 34 and 36. Usually, tile or other decorative flooring (not shown) is installed over the concrete.

Access to the cables 60, 61, 62 in ducts 30 may be effected by the use of vertical accessways (not shown) that are attached to the ducts 30 before or after the concrete is poured. However, access to the distribution ducts 30 may also be easily effected by drilling through the concrete to expose top 32 in duct 30 at the desired location. A hole of the desired size is cut or punched through the top 32 and the telephone, computer and electrical cables are all available in one location. Accordingly, it can be seen that the tenant need not be limited to a predetermined number and position of access risers or returns.

Substantial economies can be obtained through the use of the invention. Thus, metal flooring 20 may be any conventional corrugated flooring rather than custom designed, cellular electrical flooring. It is estimated that the distribution ducts 30 will occupy only about 30% of the underfloor assembly 10, and thus 70% of the underfloor assembly 10 will be made of corrugated metal flooring 20, which does not include a bottom plate such as the plate 31 of the duct 30. This greatly reduces the weight of the underflooring assembly 10 as compared to conventional electrified metal decks, which will result in great economies in installation. Since a conventional flooring 20 does not have a bottom plate, it may be nested, and hence each "lift" of the flooring 20 to the desired location of the building under construction will contain a larger number of flooring units 20 than would be the case if a cellular flooring were employed.

The bottom 52a of the trench cooperates with the sides 52b, and covers 51 to provide trench 50 with sufficient structural integrity to act as a beam. Consequently, the trenches 50 reinforce the concrete and result in a structurally stronger system than if conventional "bottomless" trenches were used.

Further advantages over conventional systems include the fact that the amount of spray fireproofing will be substantially reduced using the present invention. Thus, in conventional electrical decks, the entire cellular deck must be spray fireproofed because it is not possible to identify the cells carrying electrical cables. However, in accordance with the present invention, the cable distribution ducts 30 are readily distinguished from the corrugated flooring 20.

Similarly, in conventional electrical decks using a bottomless trench, the entire length of the bottomless trench is heavily sprayed, but in accordance with the present invention, the trenches 50 need be heavily spray fireproofed only where they intersect the cable distribution ducts 30. It can be seen that this, too, will result in substantial economies, since in the present system there are fewer intersections between trenches and ducts than in the bottomless trench system.

Another advantage of the invention is that there is approximately the same area of distribution duct available for the placement of telephone and communication line that exists in present systems. However, all of the area is in one place permitting bigger cables. Furthermore, the area available for high tension cable is more than sufficient for the technology of today.

The embodiments of the invention in which an exclusive property or privilege is claimed are defined as follows:

1. A cable distribution duct for installation under the cable trenches of an underfloor assembly, which comprises a longitudinally extending bottom plate having opposed side edges and longitudinally extending wall means on said bottom plate and defining therewith a plurality of longitudinally extending closed cells having top, opposed side and bottom portions, a said closed cell being provided at each side edge of said bottom plate, said wall means comprising a plurality of elongated inverted U-shaped top members on said bottom plate having integral opposed side portions and a top portion, said inverted U-shaped top members being longitudinally spaced apart and extending longitudinally along said bottom plate such that a said closed cell at said side edge has its top portion and the side portion thereof adjacent said side edge omitted where said closed cell at said side edge runs under said trench, said wall means further comprising a longitudinally extending inverted U-shaped divider means on said bottom plate passing through and between said top members, said top members, said divider means and said bottom plate defining three said cells, whereby all three said cells are closed cells under said top members and a said cell at said side edge has its top portion and side portion adjacent said side edge omitted in the space between adjacent spaced apart top members.

2. The cable distribution duct according to claim 1, wherein said side portions of said U-shaped top members of said cable distribution duct are spaced inwardly of the side edges of said bottom plate.

* * * * *